United States Patent [19]
Bakely et al.

[11] Patent Number: 5,172,291
[45] Date of Patent: Dec. 15, 1992

[54] INTELLIGENT POWER CONTROLLER

[75] Inventors: Laurence C. Bakely, Pitman; John J. Martelli, Jr, Cinnaminson, both of N.J.; Martin C. Horowitz, Commack, N.Y.

[73] Assignee: Struthers-Dunn, Inc., Pitman, N.J.

[21] Appl. No.: 500,366

[22] Filed: Mar. 27, 1990

[51] Int. Cl.$^5$ ............................................. H02H 3/26
[52] U.S. Cl. ...................................... 361/85; 361/91; 361/5
[58] Field of Search ................... 361/5, 3, 76, 85, 87, 361/94; 307/86, 87

[56] References Cited
U.S. PATENT DOCUMENTS

| | | | |
|---|---|---|---|
| 4,368,500 | 1/1983 | Conroy, Jr. | 361/94 |
| 4,379,317 | 4/1987 | Conroy, Jr. | 361/85 |
| 4,414,601 | 11/1983 | Conroy, Jr. | 361/97 |

*Primary Examiner*—Todd E. Deboer
*Attorney, Agent, or Firm*—Arthur L. Lessler

[57] ABSTRACT

A remotely controllable circuit breaker and switch for controlling the flow of current from a three phase AC power source to a three phase load, and usable in either wye or delta configurations. A latching relay controls the current for each phase. Current samples in the three phases are scaled and converted to DC values by scalers and RMS to DC converters. The DC values are converted to digital current values by an analog-to-digital converter which sequentially scans the DC values of the currents in the three phases. A central processing unit monitors the digital current values to detect significant phase imbalances and overcurrents which persist for time periods which exceed allowable limits according to a predetermined time-dependent function, and to initiate opening of the relays in response thereto. The central processing unit also opens and/or resets the relays in response to remote control signals. The relays are opened in a zero-crossover mode when the currents exceed predefined threshold values; and in order to minimize the effects of noise are opened without regard to zero crossover when the currents are below said threshold values. Relay status contacts are employed to reduce power consumption during relay operation by terminating relay coil drive pulses when the relay contacts have achieved the desired state.

18 Claims, 13 Drawing Sheets

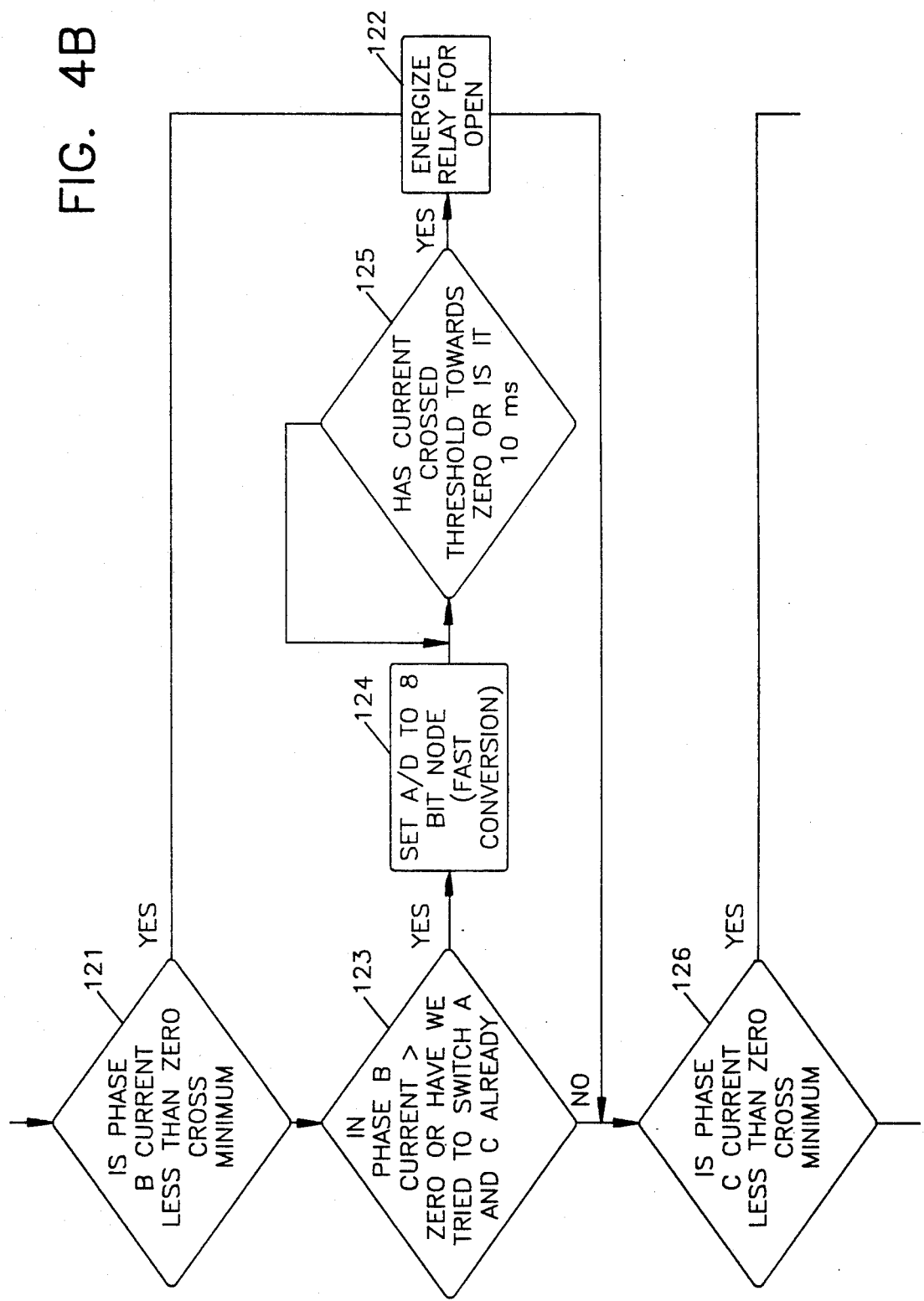

INTELLIGENT POWER CONTROLLER

BACKGROUND OF THE INVENTION

This invention relates to a relay arrangement for interrupting and switching the flow of alternating current, especially from a three phase alternating current power source to a three phase load, and means for controlling the relay arrangement. The present invention can also be applied to single phase and other power transmission systems.

Three phase alternating current power sources are commonly used on aircraft. These sources usually operate at a nominal voltage of 110-120 VRMS (155-170 v. peak) and a frequency of 400 Hz.; with the power being supplied by inverters coupled to engine-driven DC generators, or by engine-operated alternators. The aircraft usually also provide battery power at a nominal voltage of 28 v.d.c.

Circuit breakers are used on the aircraft to disconnect the power sources from various loads under overcurrent and/or (in the case of three phase power sources) phase imbalance conditions.

It is desirable that the mechanism which determines when to interrupt the flow of current be capable of responding to overcurrent or phase imbalance conditions according to a predetermined time-dependent function. That is, for small overloads there should be a relatively long response time before current flow is interrupted, so as to avoid tripping in response to temporary overloads due, for example, to motor startups; while for large overloads the response should be rapid so as to prevent damage to equipment, power sources or wiring. It is also desirable that the current flow interrupting device be remotely resettable and capable of interrupting current flow in response to a remote command, so that the device also functions as a power control switch.

In an aircraft it is necessary to provide all these features while minimizing the size and weight of the power controller, especially since a modern aircraft normally requires many of such devices.

Accordingly, it is an object of the present invention to provide an improved power controller which is especially suitable for, but not limited to, use on aircraft.

SUMMARY OF THE INVENTION

As herein described, according to one aspect of the invention there is provided a power controller for controlling the flow of current through a plurality of wires from a multi-phase AC power source to a multi-phase load, wherein each wire carries current for one of the phases. The controller has a number of relay portions equal to the number of phases. Each relay portion has an actuating coil for operating one or more sets of current switching contacts. One contact set is adapted to be connected in series with one of the wires for interrupting the flow of current from the power source to the load. Current sensing means provides AC current signals corresponding to the currents flowing through each of the wires. Current signal processing means converts the AC current signals to corresponding current-dependent digital values. Overcurrent condition detection means is coupled to the current signal processing means for generating an overcurrent trip signal when a predetermined time-dependent function of the current-dependent digital values corresponding to the current flowing through the wire for any one of the three phases exceeds a predetermined threshold value. Turn-off switch control means responsive to the overcurrent trip signal generates turn-off current pulses to actuate the coils of the relays to cause the current switching contacts thereof to open. The turn-off switch control means comprises turn-off pulse generating means for supplying a turn-off current pulse to the coil of each relay. Each turn-off current pulse is generated (i) in predetermined time relationship with a zero crossover of the current through the current switching contacts of the corresponding relay when said zero crossover mode signal is present, and (ii) upon occurrence of the overcurrent trip signal when the zero crossover mode signal is absent.

According to another aspect of the invention there is provided a power controller for controlling the flow of current through a wire from an AC power source to a load. The controller has a relay with an actuating coil for operating a set of current switching contacts adapted to be connected in series with the wire for interrupting the flow of current from the power source to said load, Current sensing means provides an AC current signal corresponding to the current flowing through the wire. Current signal processing means converts the AC current signal to a corresponding current-dependent digital value. Overcurrent condition detection means is coupled to the current signal processing means for generating an overcurrent trip signal when a predetermined time-dependent function of the current-dependent digital value corresponding to the current flowing through said wire exceeds a predetermined threshold value. Turn-off switch control means responsive to the overcurrent trip signal generates a turn-off current pulse to actuate the coil of the relay to cause the current switching contacts thereof to open. The turn-off switch control means comprises turn-off pulse generating means for supplying a turn-off current pulse to the coil of the relay. When the zero crossover mode signal is present, each current pulse is generated in predetermined time relationship with a zero crossover of the current through the current switching contacts of the relay. When the zero crossover mode signal is absent, each current pulse is generated upon occurrence of the overcurrent trip signal.

IN THE DRAWING

FIG. 4A-4D show a flow diagram showing the turn-off subroutine of the flow diagram of FIG. 3;

SYSTEM OVERVIEW

Figure 1A:
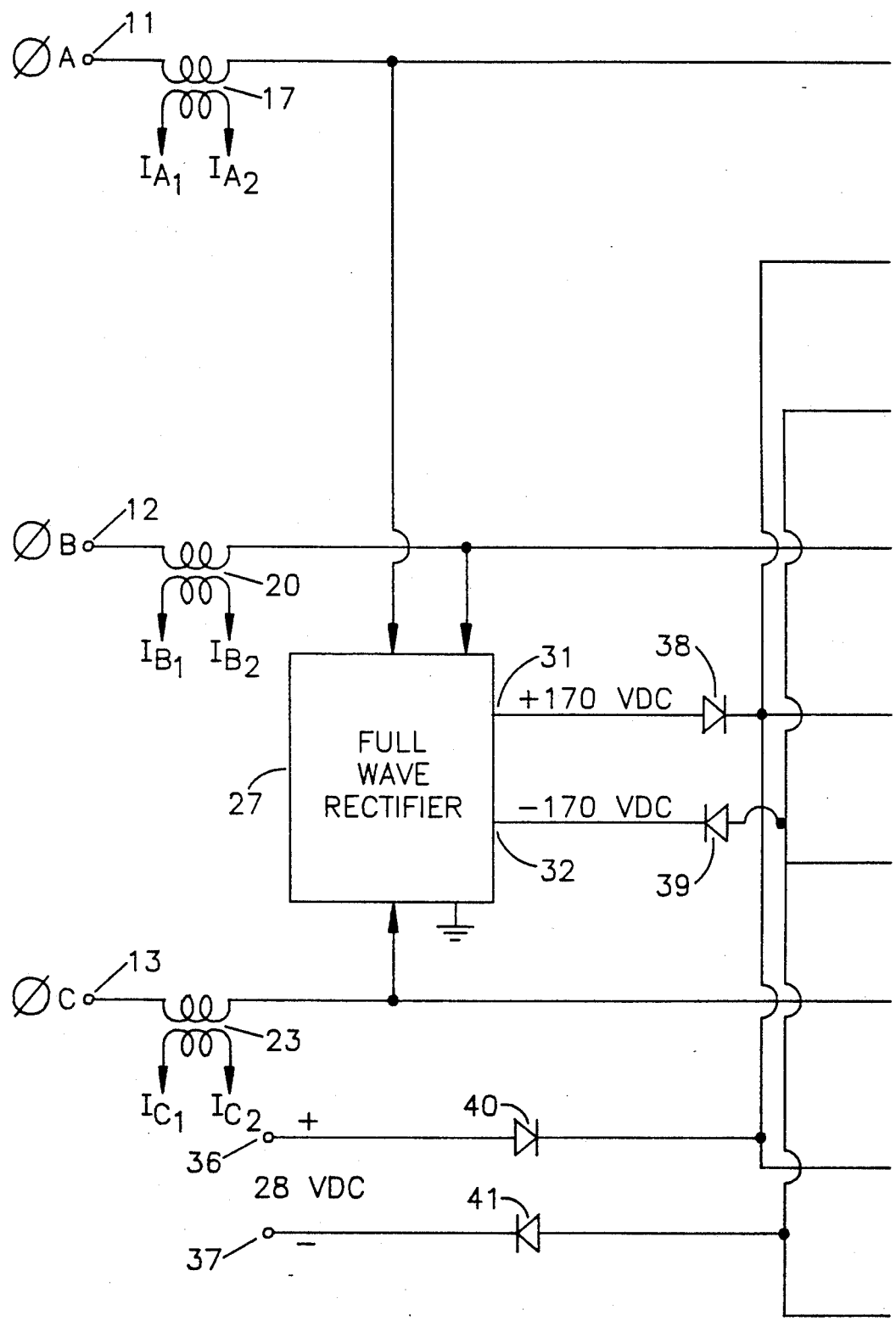
FIGS. 1A, 1B and 1C show a functional block diagram showing an intelligent power controller according to a preferred embodiment of the present invention.

In a preferred embodiment, the power controller of the invention performs the following functions in a three phase AC system:

a. Acts as a circuit breaker having a current rating which can be set at one of two or more values in response to a remote "rating" signal.

b. Has current switching contacts which can be caused to open in response to a remote "Open Contacts" signal, to interrupt current flow to a load.

c. Causes the current switching contacts to open when (i) an overcurrent condition meeting preset criteria is detected or (ii) a phase imbalance condition is detected and persists for a certain period of time. Detects the overcurrent condition by computing a preset current-time function and determining when the value of that function exceeds a predetermined threshold.

d. Closes the current switching contacts in response to a remote "Reset" signal.

e. Provides output signals indicative of whether the current switching contacts are open or closed.

f. Provides output signals indicating the presence of a trip condition, and optionally whether the trip condition is (i) an overcurrent condition or (ii) a phase imbalance condition.

g. Opens the current switching contacts at or near the zero crossover of current flow when the current exceeds a threshold value, while opening these contacts promptly and without regard to zero crossover at lower current values - so as to minimize the effects of noise.

h. To reduce power consumption and heating effects, uses latching relays to operate the current switching contacts and minimizes the duration of the current pulses applied to the relay coils by terminating the pulses as soon as the relay contacts have opened or closed.

i. To reduce switching time, drives the coils of the latching relays with a relatively high voltage pulse derived from the three phase AC power line when that voltage is available; and otherwise drives the coils with a lower voltage pulse derived from the DC power line.

These functions are provided by a relay control circuit which has a central processing unit ("CPU") employing a microcontroller or microprocessor to monitor and control the operation of the system. Current samples are converted to digital form for input to the CPU, which also receives the aforementioned remote control signals and generates the aforementioned status signals. The CPU also provides output signals to control the pulse generators which drive the relay coils to cause opening and closing of the current switching contacts.

The current samples provided to the CPU are of two types, viz. (i) values corresponding to the RMS (root mean square) current in each phase and (ii) values corresponding to the instantaneous amplitude of the current in each phase. The values (i) are employed to determine when an overcurrent trip condition or a phase imbalance condition exists, and the values (ii) are employed to determine when to provide turn-off pulses to the relay coils so that the corresponding current switching contacts open at or near zero crossover of the AC current flow.

Each set of current switching contacts is mechanically coupled to a corresponding set of status contacts which open and close in synchronism with the switching contacts. The status contacts are connected to the CPU, so that the CPU can determine the open or closed status of each set of current switching contacts. This current switching contact status information is utilized by the CPU for control purposes; and the CPU provides one or more contact status signals to a remote control system.

The times at which turn-off pulses are generated when the relays are to be actuated to open the current switching contacts in the zero crossover mode may optionally be shifted to compensate for relay operation delay due to high or low ambient temperatures.

At startup a remote keyboard or control system provides a Reset signal to the CPU, which in turn generates Close signals to the electronic switching circuits that provide turn-on current pulses to the relay coils to cause the current switching contacts to close so that the three phase power source is connected to a load. The Close signals and the corresponding turn-on current pulses are terminated as soon as the status contacts indicate that the corresponding current switching contacts have in fact closed.

The CPU then monitors the current flowing through the current switching contacts for each of the three phases in two ways:

1. By repetitively calculating a time-dependent function of the RMS current in each phase and generating an overcurrent trip signal to trip the circuit breaker and cause the current switching contacts to open if the value of the function exceeds a predetermined threshold value. The purpose of the function is to predict temperature rise in the load, which temperature rise is dependent on the power dissipated in the load; which power dissipation in turn is dependent on the square of the current flow to the load. The function is such that very large currents cause essentially immediate tripping, currents substantially larger than the rated current cause tripping after a relatively short period of time, currents somewhat larger than the rated current cause tripping after a longer time period, and currents equal to or less than the rated current (plus or minus a tolerance or "dead" band) do not cause tripping. The preferred function is an integral of the difference between the square of the RMS value of the current and a the square of a reference current value. The function, which is hereafter referred to as an "$I^2t$" function, may optionally take into account the temperature of the load and the ambient temperature in the vicinity of the load.

2. By repetitively comparing the RMS current in one phase with the RMS currents in the other two phases, and generating a phase imbalance trip signal to trip the circuit breaker and cause the current switching contacts to open if (i) the value of the RMS current in the one phase differs by more than fifteen percent (15%) from the RMS current in each of the other two phases and (ii) this difference persists for more than two seconds. That is, during one cycle Phase A is compared with Phase B and then with Phase C; during the next cycle Phase B is compared with Phase C and then with Phase A; during the next cycle Phase C is compared with Phase A and then with Phase B; and thereafter this sequence repeats itself.

The power controller may optionally also cause tripping or opening of the current switching contacts ("temperature trip") if its temperature or the temperature of the load reaches an excessively high value.

If the circuit breaker trips, it can be reset by the Reset signal from the remote control system.

DETAILED DESCRIPTION

Figure 1B:
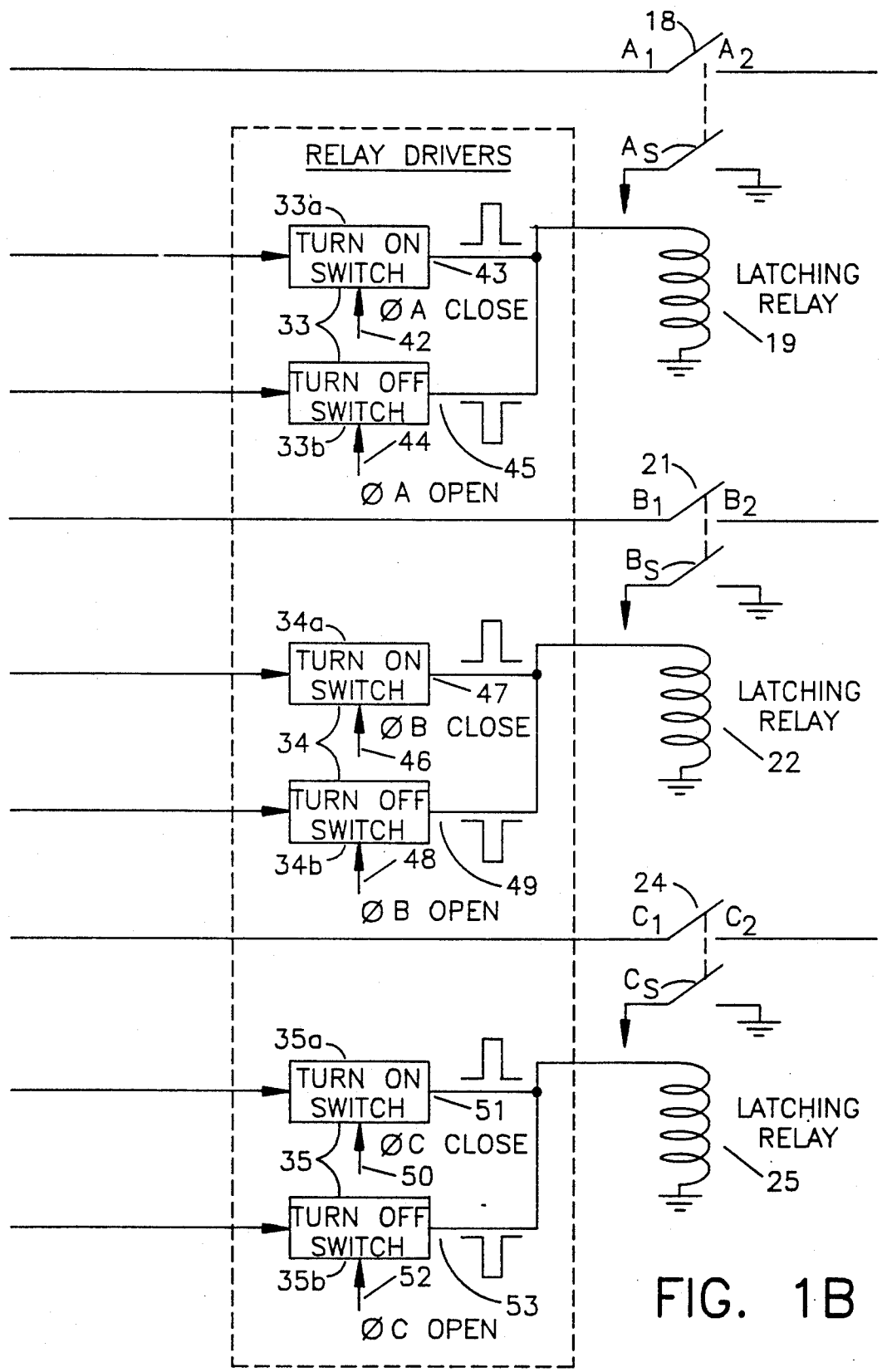
Figure 1C:
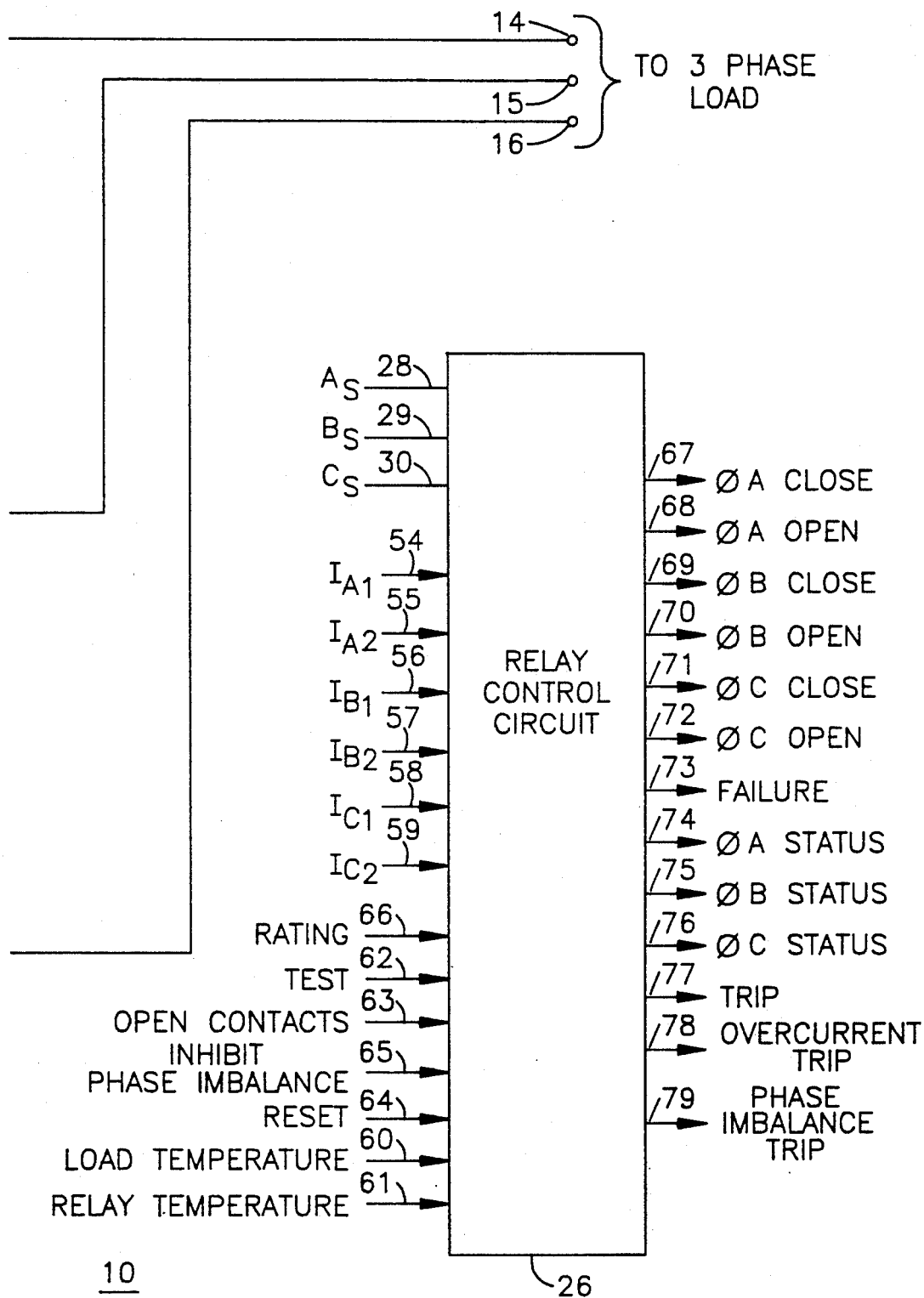

The power controller 10 shown in FIG. 1 has power line input terminals 11, 12 and 13 adapted to be connected to Phase A, Phase B and Phase C respectively of a three phase alternating current power source which may be of either wye or delta configuration; and power output terminals 14, 15 and 16 adapted to be connected to Phase A, Phase B and Phase C terminals of a three phase load.

Current for Phase A flows from input terminal 11 through the primary winding of the Phase A current sensing transformer 17, and through terminals $A_1$ and $A_2$ of current switching contact 18 of Phase A latching relay 19, to output terminal 14. Current for Phase B flows from input terminal 12 through the primary winding of the Phase B current sensing transformer 20, and through terminals $B_1$ and $B_2$ of current switching contact 21 of Phase B latching relay 22, to output terminal 15. Current for Phase C flows from input terminal 13 through the primary winding of the Phase C current sensing transformer 23, and through terminals $C_1$ and $C_2$ of current switching contact 24 of Phase C latching relay 25, to output terminal 16.

The relays 19, 22 and 25 have status contacts $A_s$, $B_s$ and $C_s$ respectively. Each status contact is mechanically coupled to the current switching contact of the corresponding relay, so that the status contact $A_s$ opens and closes at substantially the same time as the current switching contact 18; the status contact $B_s$ opens and closes at substantially the same time as the current switching contact 21; and the status contact $C_s$ opens and closes at substantially the same time as the current switching contact 24.

One terminal of each status contact is grounded. The other terminal of each status contact is connected to a corresponding input terminal (28, 29 or 30) of the relay control circuit 26, to provide input signals thereto indicative of the closed or open states of the current switching contacts 18, 21 and 24.

For improved operating speed, the latching relays 19, 22 and 25 are actuated by applying to each relay coil a drive pulse of opposite polarity to that of the preceding drive pulse. The alternate polarity drive pulses may be generated from power sources of opposite polarity with respect to ground. Alternatively, the alternate polarity drive pulses may be generated from a power source of one polarity by reversing the connections between the power source and the relay coils from one actuation to the next.

In the preferred embodiment the three phase input voltage at terminals 11, 12 and 13 is 120 VRMS, or 170 volts peak. This input voltage is converted to about 170 VDC by a three phase full wave rectifier 27. The output of the rectifier 27 may be +170 VDC with respect to ground at one terminal 31, and −170 VDC with respect to ground at another terminal 32. Alternatively, the output of the rectifier may be a potential difference of 170 VDC between two output terminals.

A relay driver 33 for the relay 19 comprises a turn-on switch or pulse generator 33a for providing a positive turn-on pulse and a turn-off switch or pulse generator 33b for providing a negative turn-off pulse to the coil of relay 19. The polarities of these pulses may be interchanged. Alternatively, the relay driver 33 may comprise a reversing switch which applies pulses of alternate polarity to the coil of the relay 19 by reversing the connections between DC power input lines to the relay driver and the corresponding terminals of the relay coil.

Similarly, relay driver 34 for relay 22 comprises a turn-on switch or pulse generator 34a for providing a turn-on pulse of one polarity and a turn-off switch or pulse generator 34b for providing a turn-off pulse of opposite polarity to the coil of relay 22; and relay driver 35 for relay 25 comprises a turn-on switch or pulse generator 35a for providing a turn-on pulse of one polarity and a turn-off switch or pulse generator 35b for providing a turn-off pulse of opposite polarity to the coil of relay 25.

Each of the relay drivers is connected to the output of rectifier 27 in order to provide relatively high voltage (about 170 VDC) drive pulses of alternate polarity to drive the coil of the corresponding relay. Each of the relay drivers is also connected to 28 VDC source terminals 36 and 37, so that if for any reason high voltage power from the rectifier 27 is unavailable, the relay drivers can nevertheless provide relatively low voltage (about 28 VDC) alternate polarity drive pulses to the corresponding relay coils.

Diodes 38, 39, 40 and 41 provide isolation between the output of rectifier 27 and the 28 VDC power lines, to prevent current flow from one power source to the other.

Upon receipt of a Phase A Close signal at its input terminal 42, relay driver 33 (turn-on switch 33a) generates a turn-on pulse at its output terminal 43 to actuate the relay 19 so as to close the current switching contact 18. Upon receipt of a Phase A Open signal at its input terminal 44, relay driver 33 (turn-off switch 33b) generates a turn-off pulse at its output terminal 45 to actuate the relay 19 so as to open the current switching contact 18.

Upon receipt of a Phase B Close signal at its input terminal 46, relay driver 34 (turn-on switch 34a) generates a turn-on pulse at its output terminal 47 to actuate the relay 22 so as to close the current switching contact 21. Upon receipt of a Phase B Open signal at its input terminal 48, relay driver 34 (turn-off switch 34b) generates a turn-off pulse at its output terminal 49 to actuate the relay 22 so as to open the current switching contact 21.

Upon receipt of a Phase C Close signal at its input terminal 50, relay driver 35 (turn-on switch 35a) generates a turn-on pulse at its output terminal 51 to actuate the relay 25 so as to close the current switching contact 24. Upon receipt of a Phase C Open signal at its input terminal 52, relay driver 35 (turn-off switch 35b) generates a turn-off pulse at its output terminal 53 to actuate the relay 25 so as to open the current switching contact 24.

Upon application of a 170 VDC drive pulse to the coil of each of the relays 19, 22, 25 at a time when the relay current switching and status contacts are closed, it takes about one-half cycle of the 400 Hz. three phase current flow, i.e. about 1.25 milliseconds ("msec."), for the contacts to open. Variations in the drive pulse amplitude on the order of 10% have been found to have very little effect on this switching time. Therefore variation of the three phase power supply from 120 VRMS (170 volts peak) down to 110 VRMS (155 volts peak) has negligible effect on switching time.

When a 28 VDC drive pulse is applied to the coil of each of the relays 19, 22, 25 at a time when the relay current switching and status contacts are closed, it takes several milliseconds for the contacts to open. The switching time is less stable than when the higher 170 VDC drive pulse is applied, but has been found to always be less than 10 msec.

For reasons discussed later on, the contacts of the relays are mechanically adjusted to have a switching time of exactly 1.25 msec. (one-half cycle of the 400 Hz. power supply waveform) at room temperature. This switching time increases somewhat at high and low temperatures, and with aging of the relay.

In applications where cycling of the contacts is permissible each time the power controller is powered up, the relay opening time can be measured by the relay control circuit 26 at that time, and the timing of the drive pulses to the relay coils can be varied accordingly; thus providing adaptive compensation for changes in relay switching time. The timing of the drive pulses may, if desired, also be varied to compensate for relay temperature variations.

In order to insure opening of the relay current switching contacts regardless of whether 170 VDC or 28 VDC pulses are applied to the relay coils, and to minimize power consumption and heating of the relay, the relay control circuit 26, when it determines that closed relay contacts are to be opened, generates a Phase A, B or C Open signal and terminates that signal (i) when the status contact $A_s$, $B_s$ or $C_s$ of the corresponding relay indicates that the current switching contact of that relay has in fact opened, or (ii) 10 msec. after the Open signal was generated, whichever event occurs first.

Similarly, in order to insure closing of the relay current switching contacts regardless of whether 170 VDC or 28 VDC pulses are applied to the relay coils, and to minimize power consumption and heating of the relay, the relay control circuit 26, when it determines that open relay contacts are to be closed, generates a Phase A, B or C Close signal and terminates that signal (i) when the status contact $A_s$, $B_s$ or $C_s$ of the corresponding relay indicates that the current switching contact of that relay has in fact closed, or (ii) 10 msec. after the Close signal was generated, whichever event occurs first.

The relay control circuit 26 accepts the input information and control signals, and provides the output signals listed below:

Information Signals a. Relay contact status signals (terminals 28, 29, 30).

b. Current samples from secondary windings of current sensing transformers 17, 20, 23 (terminals 54 to 59).

c. Load temperature (terminal 60—optional).

d. Relay temperature (terminal 61—optional).

e. Test (terminal 62—for testing purposes only; not used in normal operation).

Control Signals f. Open Contacts—Command to open the contacts of all three relays if they aren't already open (terminal 63).

g. Reset—Command to close the contacts of all three relays if they aren't already closed (terminal 64).

h. Inhibit Phase Imbalance Trip—Command to trip only on an overcurrent condition and not on a phase imbalance condition; used when the power controller is used in a single phase AC system, in which event only the current switching contact 18 of Phase A relay 19 is used (terminal 65).

i. Rating—Specifies maximum steady-state RMS current to be carried by current switching contacts (terminal 66).

The relay control circuit 26 provides the following output signals:

Output Signals j. Phase A Close—Commands Phase A relay driver 33 to start generating a pulse to close current switching contact 18 and continue generating that pulse so long as the Phase A Close signal is present (terminal 67).

k. Phase A Open—Commands Phase A relay driver 33 to start generating a pulse to open current switching contact 18 and continue generating that pulse so long as the Phase A Open signal is present (terminal 68).

l. Phase B Close—Commands Phase B relay driver 34 to start generating a pulse to close current switching contact 21 and continue generating that pulse so long as the Phase B Close signal is present (terminal 69).

m. Phase B Open—Commands Phase B relay driver 34 to start generating a pulse to open current switching contact 21 and continue generating that pulse so long as the Phase B Open signal is present (terminal 70).

n. Phase C Close—Commands Phase C relay driver 35 to start generating a pulse to close current switching contact 24 and continue generating that pulse so long as the Phase C Close signal is present (terminal 71).

o. Phase C Open—Commands Phase C relay driver 35 to start generating a pulse to open current switching contact 24 and continue generating that pulse so long as the Phase C Open signal is present (terminal 72).

p. Failure—Indicates that the self-testing program the relay control circuit microprocessor has detected a failure of part of the power controller, e.g., loss of a required input signal, a signal value outside the permitted range, failure of relay contact status to reflect response to a command given to the corresponding relay, etc. (terminal 73).

q. Phase A Status—Whether the current switching contact 18 is open or closed (terminal 74).

r. Phase B Status—Whether the current switching contact 21 is open or closed (terminal 75—optional).

s. Phase C Status—Whether the current switching contact 24 is open or closed (terminal 76—optional).

t. Trip—Indicates that the power controller has opened or attempted to open all current switching contacts due to either an overcurrent trip condition or a phase imbalance trip condition (terminal 77).

u. Overcurrent Trip—Indicates that the power controller has opened or attempted to open all current switching contacts due to an overcurrent trip condition (terminal 78—optional).

v. Phase Imbalance Trip—Indicates that the power controller has opened or attempted to open all current switching contacts due to an overcurrent trip condition (terminal 79—optional).

Each of the relay drivers 33, 34 and 35 is designed to generate a turn-on pulse of one polarity to the corresponding relay coil having a leading edge at the time of generation of the corresponding Close signal by the relay control circuit 26, and a trailing edge at the time of termination of that Close signal. Each of said drivers is also designed to generate a turn-off pulse of opposite polarity to the corresponding relay coil having a leading edge at the time of generation of the corresponding Open signal by the relay control circuit 26, and a trailing edge at the time of termination of that Open signal.

Figure 2A:
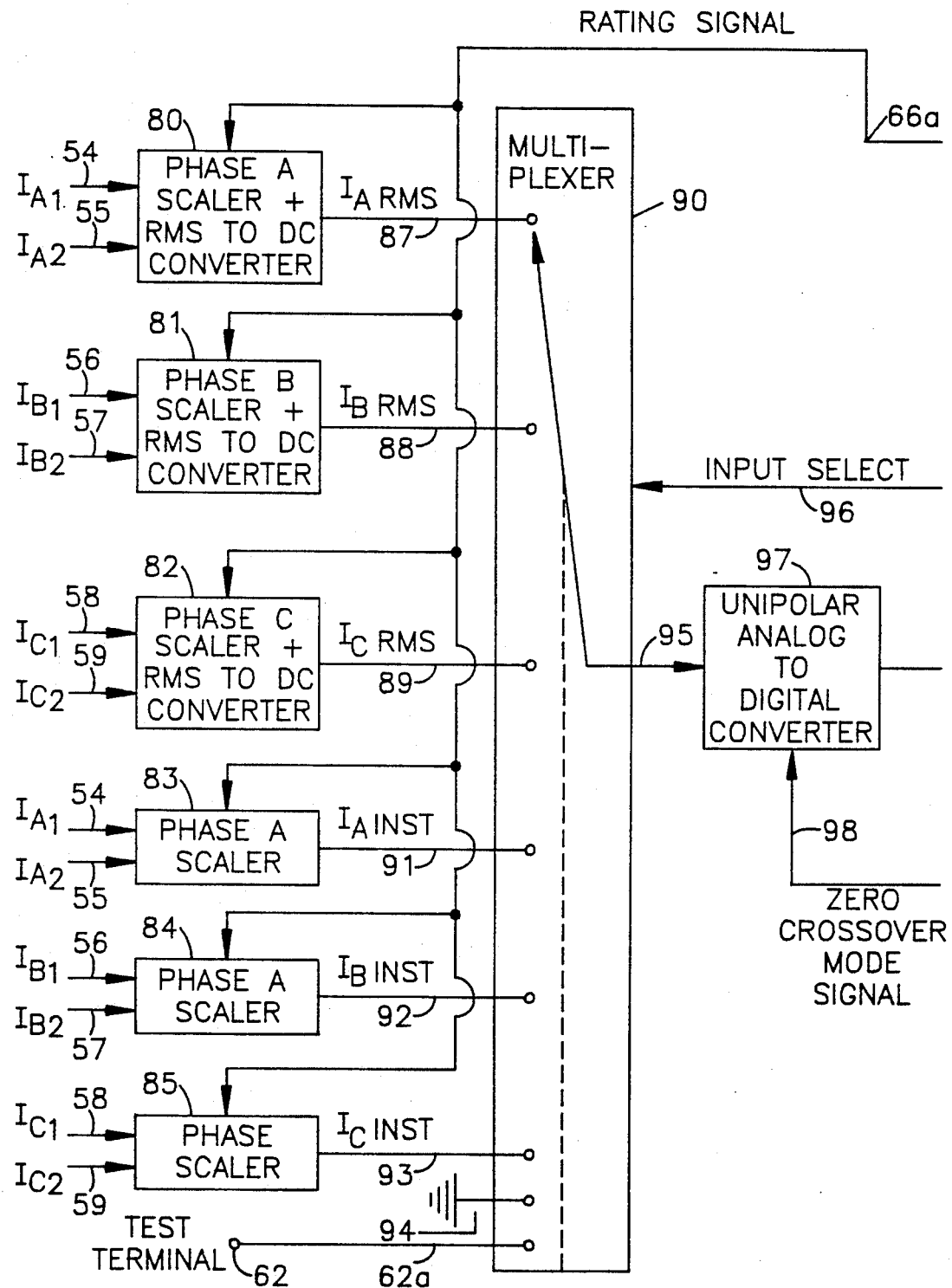
FIGS. 2A and 2B show a functional block diagram of the relay control circuit employed in the, power controller of FIG. 1.
Figure 2B:
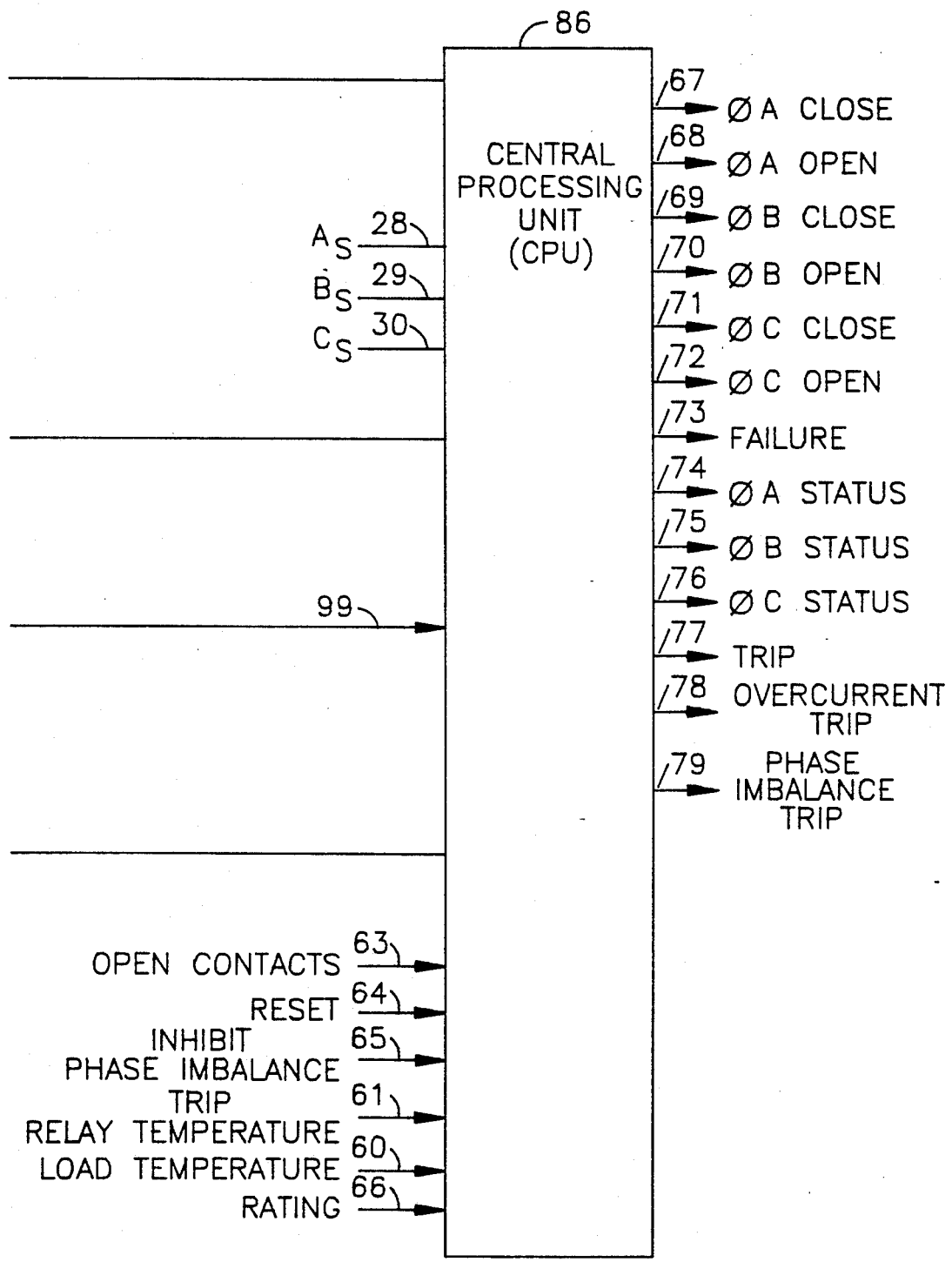

The relay control circuit is shown in FIG. 2. The current samples from the secondary windings of current sensing transformers 17, 20 and 23 are provided to (i) Phase A, B and C scaler/RMS-DC converters 80, 81 and 82 respectively, and (ii) Phase A, B and C instantaneous value scalers 83, 84 and 85 respectively. The scalers within the RMS to DC converters may be designed so that they also serve as the scalers 83, 84 and 85.

The power controller 10 is designed to be usable as a controller having two or more selectable current ratings. For example, the current switching contacts 18, 21 and 24 may be designed to have a 50 ampere steady-state rating; and the controller may have current ratings of 50 amperes or 22 amperes, as selected by a Rating signal (terminal 66 of relay control circuit 26) from the remote control system.

The relay control circuit has a central processing unit ("CPU") 86 comprising a microcontroller or microprocessor which receives control signals from the remote control system, supervises the operation of the power controller 10, and generates output signals for use by the remote control system. The microprocessor preferably has a clock rate of at least 12 MHz. and may be either an eight or a sixteen bit device, the sixteen bit device being preferred.

The scalers within blocks 80, 81 and 82, and the scalers 83, 84 and 85 multiply or divide the current sample signals from the secondary windings of the corresponding current sensing transformers in response to the Rating signal from the CPU. For example, if the current sample signals normally reflect the current range associated with a 50 ampere rated controller, in response to a 22 ampere rating signal the scalers would multiply the current sample signals by 50/22. The scalers preferably comprise operational amplifiers.

The RMS to DC converters within blocks 80, 81 and 82 convert the scaled current sample signals for Phase A, B and C respectively to DC levels ($I_{ARMS}$, $I_{BRMS}$, $I_{CRMS}$) which indicate the RMS values of the currents flowing through the primary windings of the corresponding current sensing transformers, i.e. the Phase A, B and C currents being supplied to the load. These DC levels vary, of course, as the load draws more or less current through the power controller.

The outputs of the RMS to DC converters are coupled to corresponding Phase A, B and C RMS current value input terminals 87, 88 and 89 of an analog multiplexer 90. The outputs of scalers 83, 84 and 85 (which provide Phase A, B and C instantaneous value current sample signals $I_{AINST}$, $I_{BINST}$ and $I_{CINST}$ respectively) are coupled to corresponding Phase A, B and C instantaneous current value input terminals 91, 92 and 93 of the multiplexer 90.

The test terminal 62 is also coupled to an input terminal 62a of the multiplexer 90. For voltage reference purposes another input terminal 94 of the multiplexer is grounded.

The multiplexer 90 has an output terminal 95 which may be selectively connected to any one of the multiplexer input terminals in accordance with an Input Select address code provided to the multiplexer by the microprocessor 86 on line 96. Thus the microprocessor instructs the multiplexer as to which of the various multiplexer input signals the microprocessor desires to "look" at.

The output terminal 95 of the multiplexer is connected to the input terminal of a unipolar analog-to-digital ("A/D") converter 97 which converts the signal level at said input terminal to a corresponding digital value which is provided to the CPU 86 on line 99. The A/D converter 97 provides a high resolution 12 bit output under normal operating conditions where the current flow through each phase is merely being monitored. When the microprocessor determines that the relay current switching contacts 18, 21 and 24 are to be opened at zero crossovers of the current flow, it provides a zero crossover mode signal to the A/D converter 97 on line 98, placing the A/D converter in a lower resolution higher sampling speed 8 bit output mode needed for the rapid repetitive sampling of the instantaneous value of the current in each phase which is required for zero crossover switching.

During normal monitoring operation, the microprocessor 86 causes the multiplexer 90 to scan only the input terminals 87, 88 and 89; i.e. to monitor the RMS current in each phase. Each of these terminals is scanned once every 10 msec.

Once the microprocessor has made a determination to open the relay contacts, it causes the multiplexer to scan only the input terminals 91, 92 and 93. Each of these terminals is then scanned once every 24 microseconds.

Figure 3A:
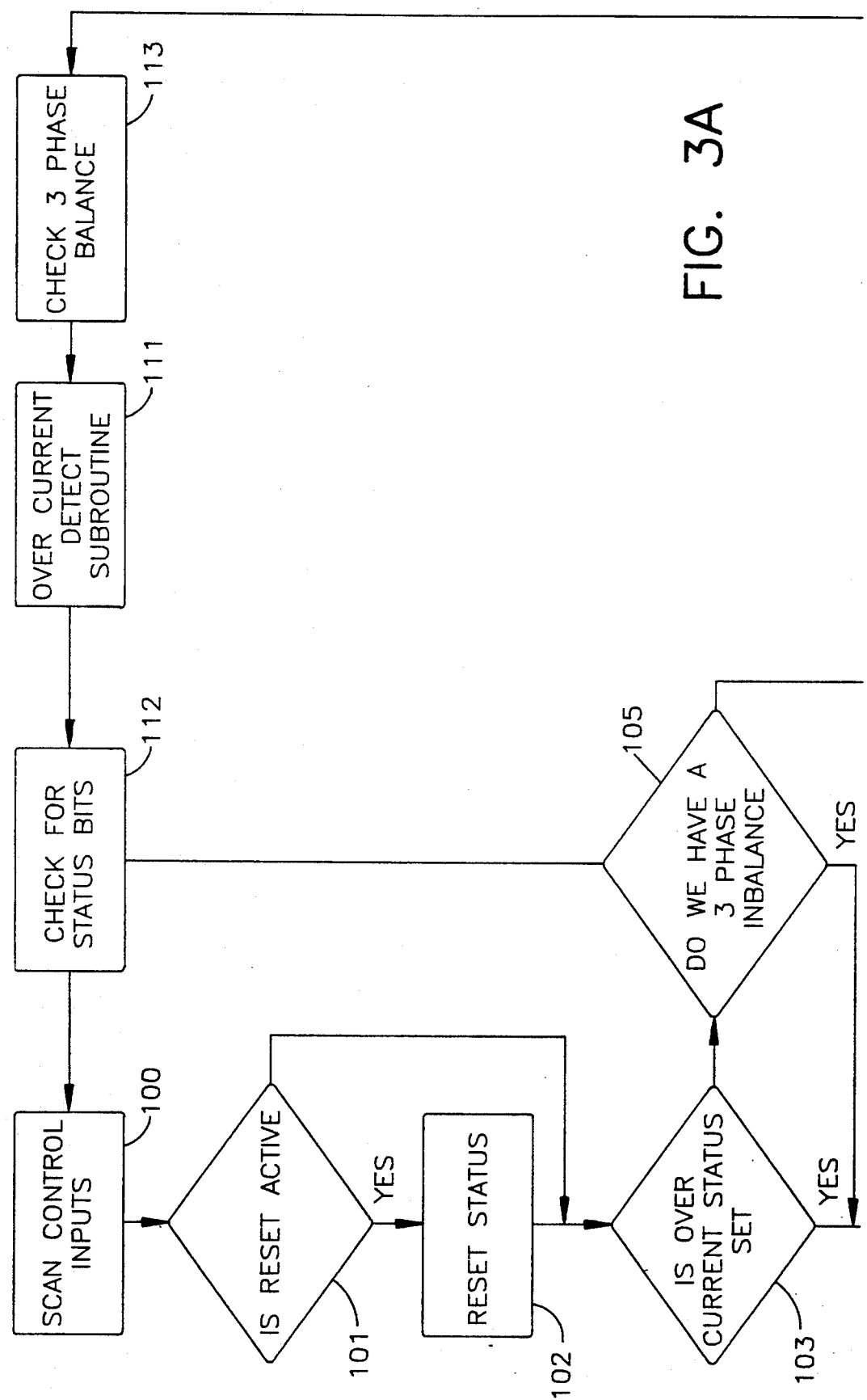
FIGS. 3A and 3B show a flow diagram showing the method of operation of the power controller shown in FIG. 1.
Figure 3B:
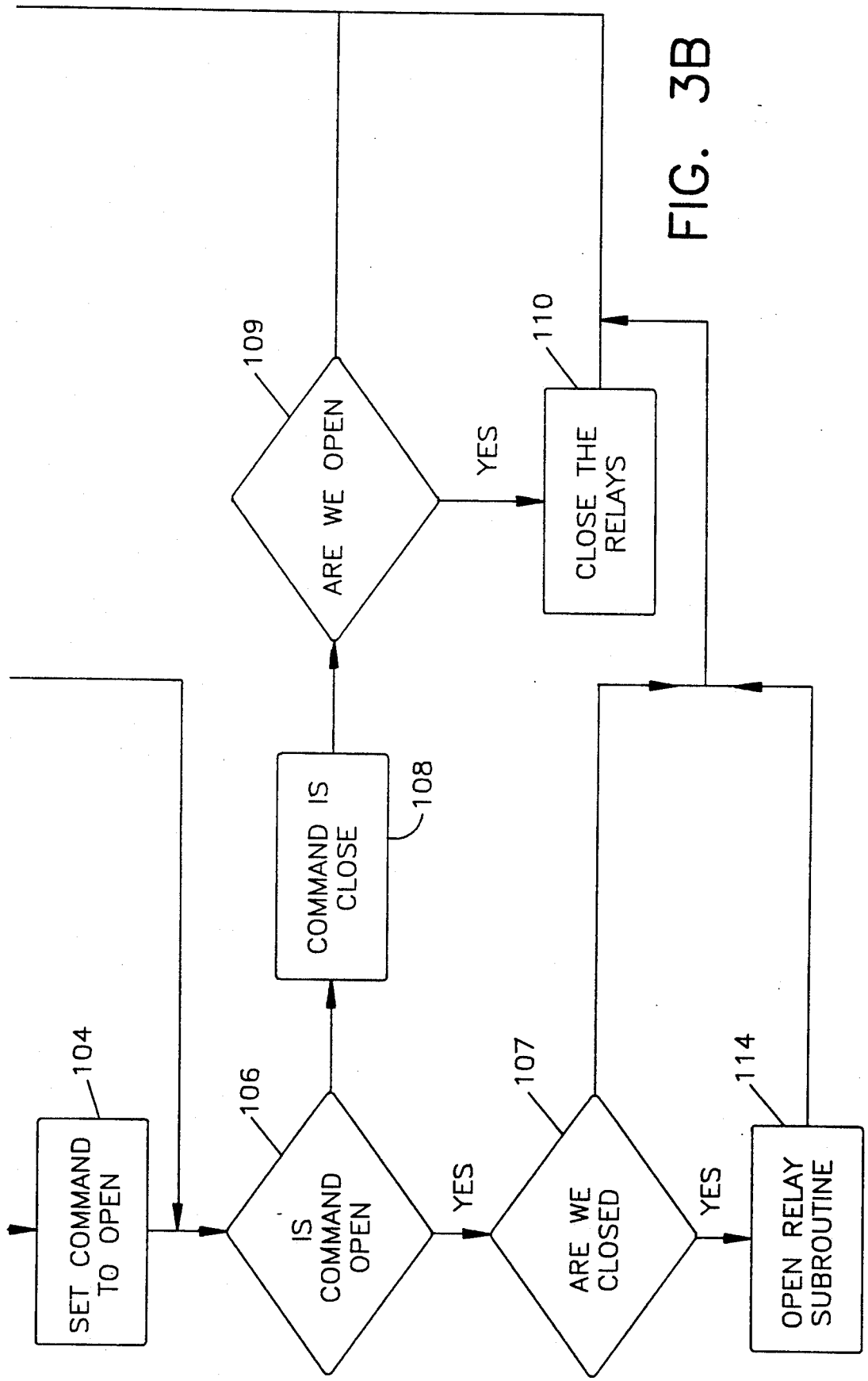

The manner in which the CPU 86 processes data and control inputs and supervises the operation of the power controller is illustrated by the flow diagram of FIG. 3.

At Step 100 the control inputs at terminals 63 through 66 are scanned to determine the instructions of the remote control system. At Step 101, if a Reset instruction is present the program proceeds to Step 102; otherwise it proceeds to Step 103. At Step 102 the controller is placed in the Reset mode and the program proceeds to Step 103.

At Step 103 a determination is made as to whether the overcurrent flag has been set, and if so the program proceeds to Step 104 which generates an overcurrent trip signal and commands the contacts of the relays to be opened; after which the program proceeds to Step 106. If the overcurrent flag has not been set the program proceeds from Step 103 to Step 105, which determines whether the phase imbalance flag has been set. If at Step 105 the phase imbalance flag has been set the program proceeds to Step 104; otherwise it proceeds to Step 106.

At Step 106, if the relay contacts have been commanded to open the program proceeds to Step 107; otherwise the program proceeds to Step 108 which commands the contacts of the relays to be closed—since if the contacts have not been commanded to be opened they must be commanded to be closed, as these are the only two permitted relay contact states.

After Step 108 the program proceeds to Step 109 which determines whether the contacts of the relays are open, and if so proceeds to Step 110 which generates Close signals at CPU terminals 67, 69 and 71 to the relay drivers and proceeds to Step 113. If at Step 109 the relay contacts are not open the program proceeds directly to Step 113.

Figure 4A:
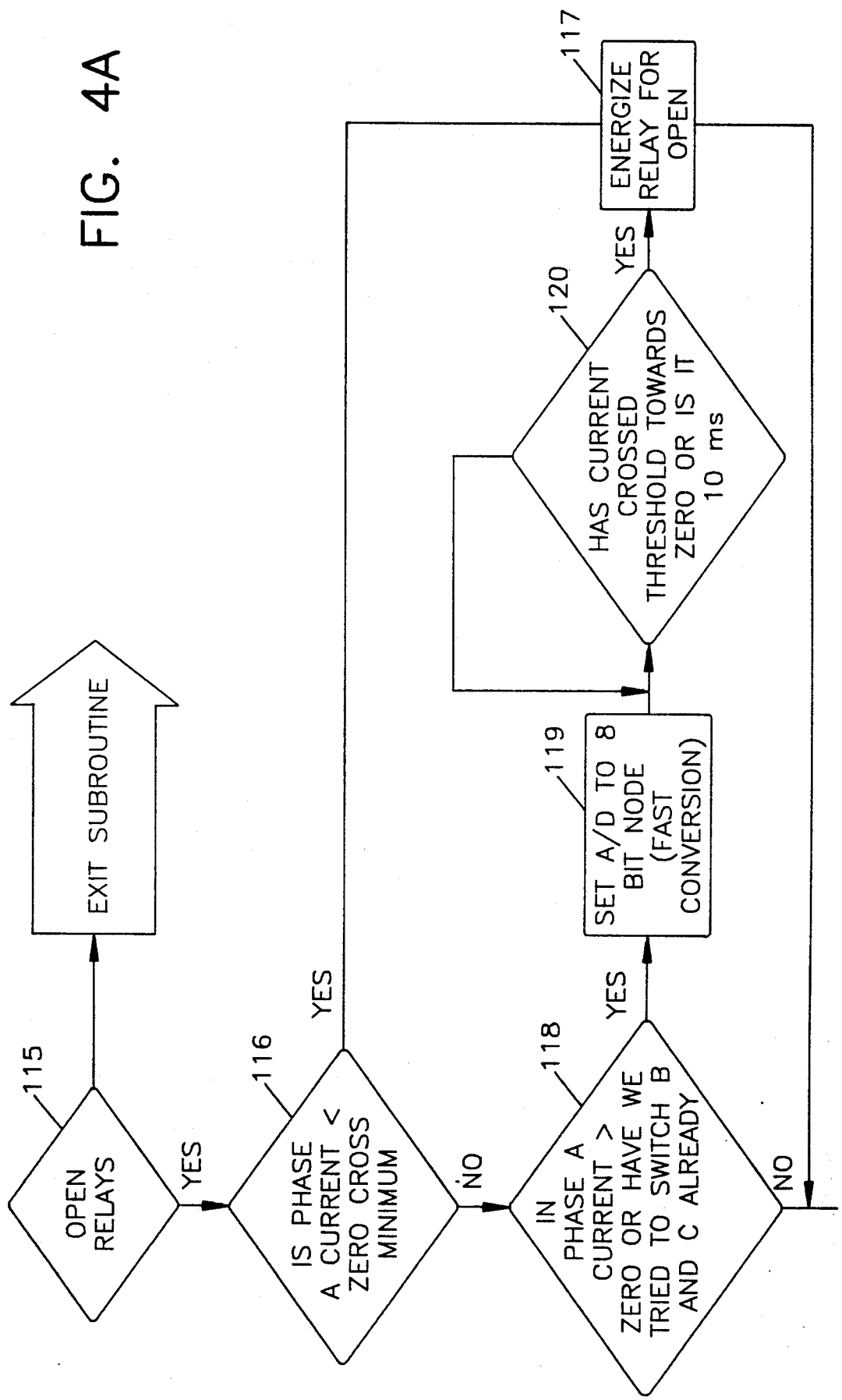
Figure 4C:
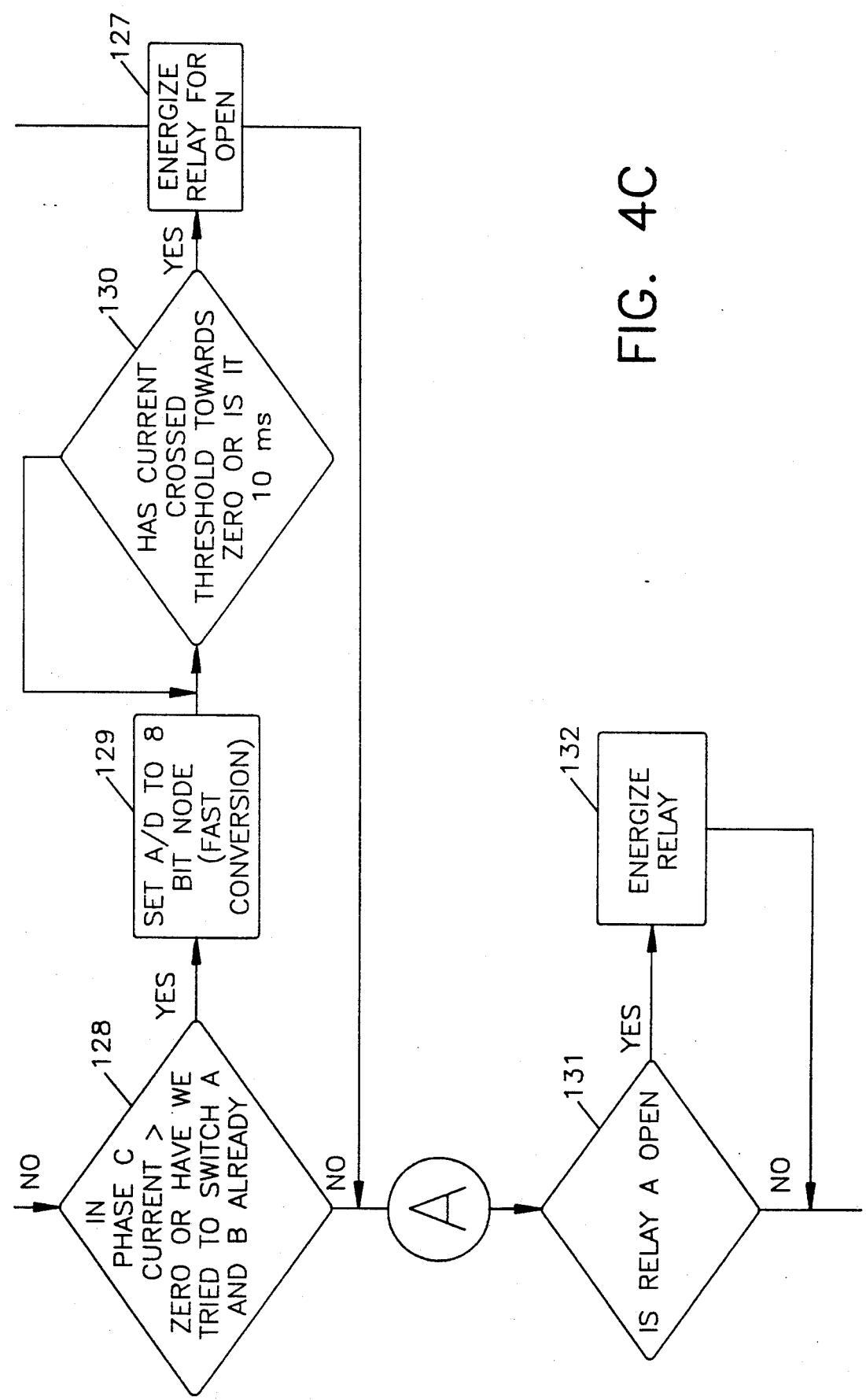
Figure 4D:
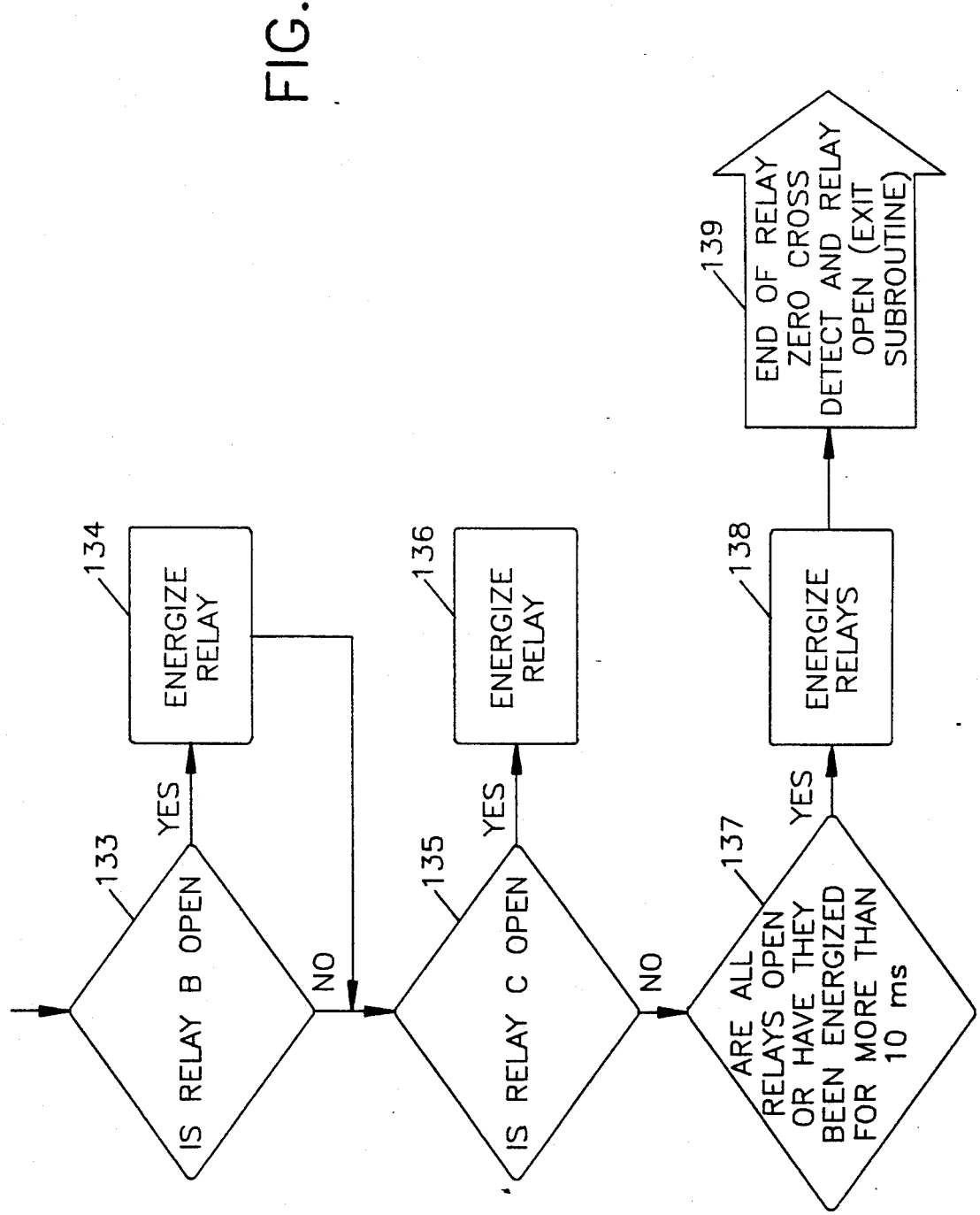

At Step 107 a determination is made as to whether the contacts of the relays are closed, and if so the program proceeds to Step 114 which carries out the Open Relay Subroutine shown in FIG. 4 and then proceeds to Step 113; otherwise the program proceeds directly to Step 113.

At Step 113 the program compares the current in one phase (Phase A, for example) with the current in each of the other two phases, and sets a phase imbalance flag (see Step 105) if there is more than a 15% difference between the currents. In the next succeeding program cycle the current in the next phase (Phase B, for example) is compared with the currents in the other two phases; and in the next succeeding program cycle the current in the third phase (Phase C, for example) is compared with the currents in the other two phases. This comparison process is repeated in subsequent cycles. After Step 113 the subroutine proceeds to Step 111.

At Step 111 the program calculates a current-time function (the "$I^2t$" function) for each phase which is preferably the time integral of the difference between the square of the current in that phase and the square of a threshold current, i.e.

$$f(I, t) = \int_{to} (I^2 - I^2_{TH})dt$$

where I is the current in the phase involved and $I_{TH}$ is the threshold current. The threshold current is preferably set above the current rating of the controller by a margin sufficient to avoid tripping during small excursions over the rated current but not so much as to endanger equipment or wiring. Typically the threshold current may be set about five percent above the rated current. That is, for a controller operated at a rating of 50 amperes $I_{TH}$ may typically be set at 52.5 amperes; and when that controller is operated at a rating of 22 amperes $I_{TH}$ may typically be set at 23.1 amperes.

This function is a measure of heat buildup in the load, and the overcurrent flag is set when the value of the $I^2t$ function exceeds a predetermined threshold value $(I^2t)TH$. The $I^2t$ function for each phase is calculated at intervals of 30 msec.; and the value of this function is not permitted to be less than zero.

Figure 6:
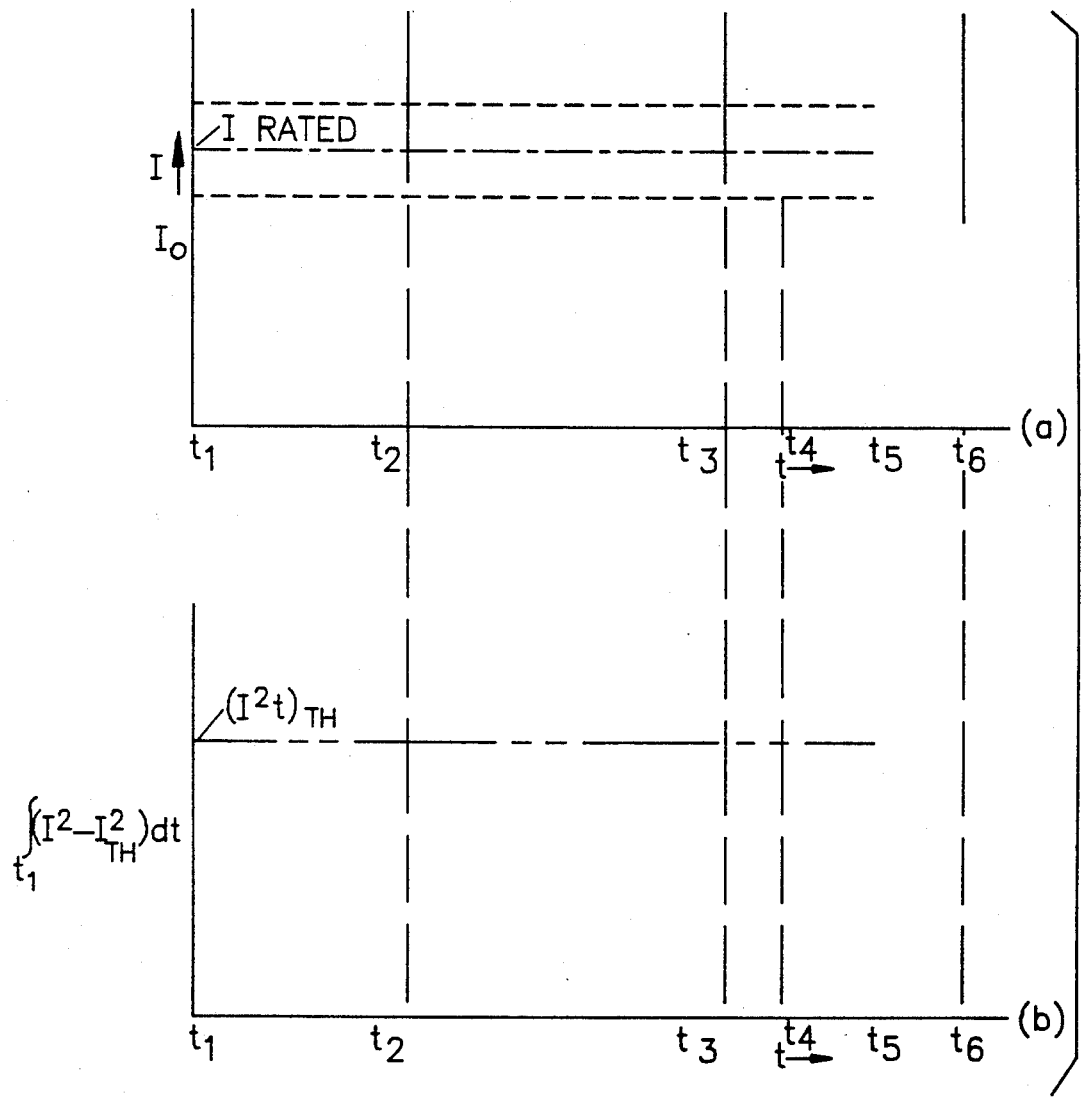
FIG. 6 is a diagram illustrating the operation of the overcurrent detection subroutine of the flow diagram of FIG. 3.

FIG. 6 shows an example of the calculation of the $I^2t$ function. Plot (a) shows the manner in which load current in one phase might vary with time for a particular load and control situation.

In plot (a) of FIG. 6, at time $t_1$ the controller is turned on and the current in the phase rises to an initial value $I_0$ from which the current rises and enters a "dead band" above and below the rated current $I_{Rated}$ by a preset tolerance ($\pm 5\%$ in the previous example), the dead band being indicated by dashed lines in plot (a) of FIG. 6.

As the current rises above the top of the dead band at time $t_2$, the $I^2t$ function assumes a positive value and begins to increase, as shown in plot (b) of FIG. 6. The current then begins to decrease and at time $t_3$ dips below the top of the dead band. While the current is in the dead band it is assumed that the load is neither accumulating nor getting rid of excess heat, as it is operating at or near its rated current; and therefore the argument $I^2t - I^2t_{TH}$ of the $I^2t$ function is set at zero so that the integral thereof neither increases nor decreases. Thus the $I^2t$ function has a plateau while the current is in the dead band.

At time $t_4$ the current falls below the dead band and the value of the $I^2t$ function begins to decrease.

At time $t_5$ the remote control system commands the controller to open the current switching contacts of the relays, as a result of which the current drops to zero. However, calculation of the $I^2t$ function continues, because the load is still assumed to be at a higher than normal temperature, although in a cool-down state.

The value of the $I^2t$ function continues to decrease after time $t_5$ until at time $t_6$ the remote control system commands the controller to reset and close the relay contacts. At this time the current rises to $I_0$ and begins to increase, but since the current is initially below the dead band the $I^2t$ function continues to decrease, as the value of the argument $I^2t - I^2t_{TH}$ is negative and the load is assumed to be dissipating heat more rapidly than it is accumulating heat.

If desired, the $I^2t$ function could be made more accurate by adjusting it to take into account the actual load temperature. Additional accuracy could be achieved by incorporating in the $I^2t$ function an adjustment for the ambient temperature in the vicinity of the load, but this adjustment would probably have only a minor effect in most cases.

After completing the overcurrent detection subroutine as previously described at Step 111 of FIG. 3, and setting the overcurrent status flag if it is determined that an overcurrent condition exists (see Step 103), the subroutine advances to Step 112 which checks the status contacts $A_s$, $B_s$ and $C_s$ to determine the open or closed status of the corresponding current switching contacts 18, 21 and 24. The subroutine then proceeds back to Step 100, the initial step thereof.

FIG. 4 shows the Open Relay Subroutine of Step 114, i.e. the manner in which the CPU supervises opening of the relay contacts once it determines that they are to be opened, whether because of a trip condition or because the remote control system has requested such action. The controller operates to open the contacts of all three relays if those contacts are not already open (i) whenever there is an over-current trip condition in any phase, (ii) whenever there is a phase imbalance condition and no phase imbalance inhibit control signal is present, and (iii) whenever the remote control system provides an Open Contacts signal.

The controller operates to close the contacts of all three relays if those contacts are open when a Reset signal is received and the Open Contacts signal is not present.

At Step 115, if the relay contacts are not to be opened the subroutine exits; otherwise it proceeds to Step 116, which determines whether the RMS current in Phase A is less than a preset threshold value near the current rating of the current switching contact 18. If the RMS current in Phase A is less than the threshold value it is safe for the relay contact 18 to open without regard to zero crossover, and the subroutine goes to Step 117 which causes the relay driver 33 to immediately provide a turn-off pulse to the coil of relay 19 to cause the contact 18 to open.

If at Step 116 the Phase A RMS current is above the threshold, the subroutine proceeds to Step 118 which determines whether at least one of two conditions have been met, viz. (i) whether the Phase A current is greater than zero or (ii) whether the subroutine has already generated a signal to cause opening of the contacts of the Phase B and Phase C relays 22 and 25. If either condition is met, the subroutine proceeds to Step 119 which generates a zero crossover mode signal on line 98 to speed up the conversion rate of the A/D converter 97 so that Phase A instantaneous current value samples can be taken at frequent intervals during a positive half cycle of the AC current waveform.

Then the subroutine proceeds to Step 120 which embodies a loop to repetitively look for a downward transition of the Phase A instantaneous current across a threshold corresponding to the current rating of the current switching contact 18. When the transition is detected the subroutine advances to Step 117 which initiates events resulting in opening of the contact 18 a half cycle later.

If neither of the conditions monitored at Step 118 has occurred, or after Step 117 if at least one of those conditions has occurred, the subroutine proceeds to Step 121, which does for Phase B what Step 116 did for Phase A. Similarly, Steps 122 through 125 do for Phase B what Steps 117 through 120 respectively did for phase A.

If neither of the conditions monitored at Step 123 has occurred, or after Step 122 if at least one of those conditions has occurred, the subroutine proceeds to Step 126, which does for Phase C what Step 121 did for Phase B. Similarly, Steps 127 through 130 do for Phase C what Steps 122 through 125 respectively did for phase B.

If neither of the conditions monitored at Step 128 has occurred, or after Step 127 if at least one of those conditions has occurred, the subroutine proceeds to Step 131, which monitors status contact As to determine whether the Phase A current switching contact 18 has opened. If so, the subroutine proceeds to Step 132 which causes termination of the turn-off pulse to the coil of relay 19.

If at Step 131 the status contact $A_s$ indicates that the contact 18 has not yet opened, or after Step 132 if the status contact $A_s$ indicates that contact 18 has opened, the subroutine proceeds to Step 133. Steps 133 and 134 do for Phase B what Steps 131 and 132 did for Phase A.

If at Step 133 the status contact $B_s$ indicates that the contact 21 has not yet opened, or after Step 134 if the status contact $B_s$ indicates that contact 21 has opened, the subroutine proceeds to Step 135. Steps 135 and 136 do for Phase C what Steps 133 and 134 did for Phase B.

If at Step 135 the status contact $C_s$ indicates that the contact 24 has not yet opened, the subroutine proceeds to Step 137, which monitors all three status contacts $A_s$, $B_s$ and $C_s$. After all three status contacts have opened, or after the coils of all three relays have been energized with turn-off pulses for 10 msec., the subroutine exits at Step 139.

The manner in which the Open Relay Subroutine of FIG. 4 operates when in its zero crossover mode is illustrated by the timing diagram of FIG. 6, in which plots (a), (c) and (e) show the (excessively high) 400 Hz. Phase A, B and C currents respectively, and plots (b), (d) and (f) show the corresponding turn-off pulses applied to the coils of the relays 19, 22 and 25 respectively.

In the example of FIG. 6, it is assumed that at time $t_1$ the CPU 86 determines that the relay contacts are to be opened. At that time the instantaneous current $I_{AINST}$ in Phase A is considerably above its rated value $I_{Rated}$; the instantaneous current $I_{BINST}$ in Phase B is negative; and the instantaneous current $I_{CINST}$ in Phase C is below $I_{Rated}$.

The CPU monitors each of the three instantaneous currents at 24 microsecond intervals, taking about 52 samples per half-cycle of the 400 Hz. current waveform, and looks for a transition between adjacent samples from a current value above the rated current value to a current value below the rated value. Since the A/D converter 97 which provides the samples is unipolar and set to convert positive polarity input signals, it provides digital values corresponding only to the positive half cycles of the AC current waveform, providing a zero output during the negative half cycles.

Figure 5:
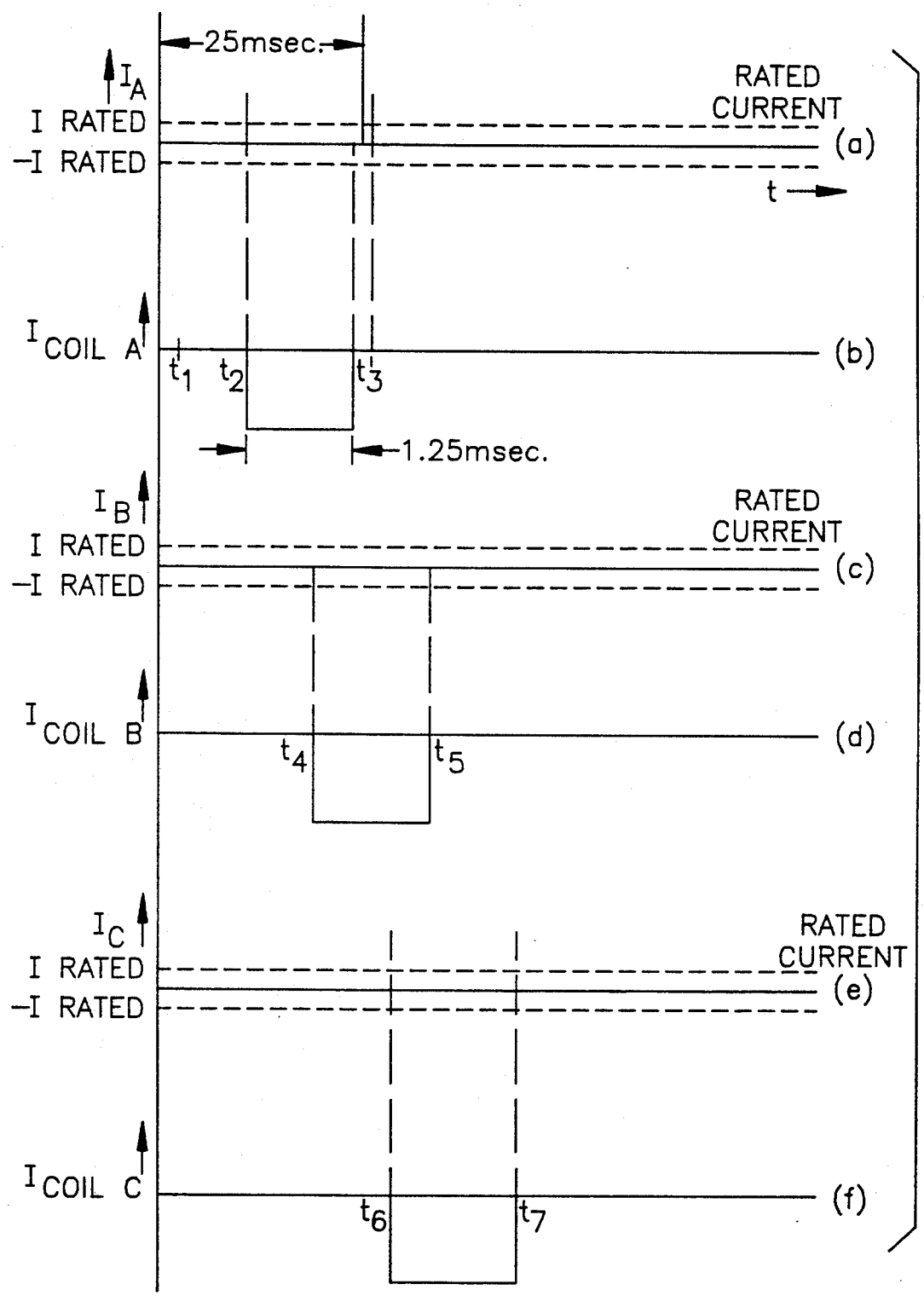
FIG. 5 is a timing diagram showing the manner in which the current switching contacts of the relays of the controller are caused to open in the zero crossover mode.

That is, the CPU detects when the current in one of the phases first drops across the value $I_{Rated}$. In the example of FIG. 5 this first occurs in Phase A, and at time $t_2$. When this crossover occurs the CPU generates a Phase A Open control signal at terminal 68, causing the relay driver 33 to provide a high voltage (about 170 VDC) turn-off pulse to the coil of the relay 19, causing the current switching contact 18 and the status contact $A_s$ of the relay to open a half-cycle later (since the contacts were previously adjusted to operate with this delay time) at time $t_3$. At this time the Phase A current is negative, is just crossing $I_{Rated}$ and is approaching zero, so that the current flow through the current switching contact 18 will not exceed the contact rating; and the current flowing through the contact will not exceed the contact rating even if due to aging or temperature extremes the relay operating time is lengthened so that the contacts open as late as time $t_3'$.

When the current switching contact 18 and the status contact $A_s$ open at time $t_3$, the CPU senses the opening of the status contact and terminated the Phase A Open control signal, causing termination of the turn-off pulse produced by relay driver 33.

If the high DC voltage is not available to supply power for the turn-off pulse, the lower voltage 28 VDC power supply is used instead, resulting in a much longer relay operating time. This longer operating time, however, does not present any problem, since the absence of the high DC voltage is due to the absence of voltage on the three phase AC power line—and thus there is little or no current flowing through the current switching contacts at this time. The turn-off pulse is terminated, as before, when the status contact $A_s$ indicates that the current switching contact 18 has opened.

If after issuing the Phase A Open control signal 10 msec. elapses and the CPU does not receive a signal from the status contact $A_s$ indicating that the current switching contact 18 has opened, the Phase A open control signal is terminated to terminate the turn-off pulse to the relay coil.

As soon as the CPU issues the Phase A Open control signal it looks for a transition in one of the other two phases from above to below the rated current $I_{Rated}$ It detects this transition at time $t_4$ and generates a Phase B Open control signal at terminal 70, normally causing contacts 21 and $B_s$ of relay 22 to open at time $t_5$ and at that time terminating the corresponding turn-off pulse generated by relay driver 34.

As soon as the CPU issues the Phase B Open control signal it looks for a transition in Phase C from above to below the rated current $I_{Rated}$ It detects this transition at time $t_6$ and generates a Phase C Open control signal at terminal 72, normally causing contacts 24 and $C_s$ of relay 25 to open at time $t_7$ and at that time terminating the corresponding turn-off pulse generated by relay driver 35.

In the event the high voltage DC source is not available to supply power for generating the turn-off pulses for the Phase B and Phase C relays 22 and 25, the 28 VDC source is used, as described above with respect to Phase A. There is also a 10 msec. time-out to terminate the turn-off pulses for the Phase B and Phase C relays, as described above with respect to Phase A.

We claim:

1. A circuit breaker for controlling the flow of current through three wires from a three phase AC power source to a three phase load, each wire carrying current for one of the three phases, comprising:

first, second and third relays, each relay having an actuating coil and a set of current switching contacts adapted to be connected in series with a respective one of said wires for selectively interrupting the flow of current from said power source to said load;

current sensing means for providing three AC current signals corresponding to the currents flowing through said three wires;

current signal processing means for converting said AC current signals to corresponding current-dependent digital values at a predetermined conversion rate, and for increasing said conversion rate in response to a zero crossover mode signal;

phase imbalance detection means coupled to said current signal processing means for comparing the current-dependent digital values corresponding to the current flowing through the wire for each of the three phases with the current-dependent digital values corresponding to the currents flowing through the wires for the other phases, and for generating a phase imbalance trip signal when the currents flowing through said wires differ by more than a predetermined threshold amount;

overcurrent condition detection means coupled to said signal processing means for generating an overcurrent trip signal when a predetermined time-dependent function of the current-dependent digital values corresponding to the current flowing through the wire for any one of said three phases exceeds a predetermined threshold value; and turn-off switch control means responsive to either one of said trip signals for generating turn-off current pulses to actuate the coils of said relays to cause the current switching contacts thereof to open, said turn-off switch control means comprising:

zero crossover mode determination means for generating a zero crossover mode signal when said current dependent digital values are above a predefined threshold value, said zero crossover mode signal being coupled to said current signal processing means to increase the conversion rate thereof, and turn-off pulse generating means for supplying a turn-off current pulse to the coil of each relay, each said current pulse being generated (i) in predetermined time relationship with a zero crossover of the current through the current switching contacts of the corresponding relay when said zero crossover mode signal is present, and (ii) upon occurrence of the corresponding trip signal when said zero crossover mode signal is absent, and terminating upon the earlier of (a) expiration of a predetermined time period measured from the beginning of said current pulse and (b) opening of the current switching contacts of the corresponding relay.

2. The circuit breaker according to claim 1, wherein said turn-off switch control means includes means for generating said turn-off pulses in response to a load disconnect input signal.

3. The circuit breaker according to claim 1, further comprising turn-on switch control means responsive to a reset signal for generating turn-on current pulses to actuate the coils of said relays to cause the current switching contacts thereof to open, said turn-on switch control means comprising turn-on pulse generating means for supplying a turn-on current pulse to the coil of each relay, each said current pulse terminating upon the earlier of (a) expiration of a pre-established time period measured from the beginning of said turn-on current pulse and (b) closing of the current switching contacts of the corresponding relay.

4. The circuit breaker according to claim 3, wherein the turn-on current pulses applied to each relay are of opposite polarity to the turn-off current pulses applied to that relay.

5. The circuit breaker according to claim 1, 2 or 3, wherein each relay is a latching type relay.

6. The circuit breaker according to claim 1, 2 or 3, wherein said current pulses are DC pulses, including means for generating said current pulses from said three phase power source when the same is available, and for generating said current pulses from a lower voltage DC power source when said three phase power source is not available.

7. The circuit breaker according to claim 1, wherein said current signal processing means comprises:

scaling means for adjusting the amplitude of said AC current signals to maintain the same within a desired range;

RMS to DC conversion means for generating three DC signals, each of said DC signals having a value corresponding to an RMS value of a respective one of said AC current signals; and analog-to-digital conversion means for repetitively converting said DC signals to corresponding ones of said current-dependent digital values.

8. The circuit breaker according to claim 1, 2 or 3, wherein each of said relays has a set of status contacts mechanically coupled to the current switching contacts thereof, so that the status contacts of each relay open and close substantially at the same time as the current switching contacts thereof.

9. The circuit breaker according to claim 8, wherein said turn-off pulse generating means terminates the turn-off pulse to each relay in response to opening of the status contacts of that relay prior to expiration of said predetermined time period.

10. The circuit breaker according to claim 3, wherein each of said relays has a set of status contacts mechanically coupled to the current switching contacts thereof, so that the status contacts of each relay open and close substantially at the same time as the current switching contacts thereof, and said turn-on pulse generating means terminates the turn-on pulse to each relay in response to closing of the status contacts of that relay prior to expiration of said pre-established time period.

11. A circuit breaker for controlling the flow of current through a plurality of wires from a multi-phase AC power source to a multi-phase load, each wire carrying current for one of the phases, comprising:

a number of relay portions equal to the number of phases, each relay portion having an actuating coil for operating one or more sets of current switching contacts adapted to be connected in series with respectives ones of said wires for interrupting the flow of current from said power source to said load;

current sensing means for providing AC current signals corresponding to the currents flowing through each of said wires respectively;

current signal processing means for converting said AC current signals to corresponding current-dependent digital values;

overcurrent condition detection means coupled to said current signal processing means for generating an overcurrent trip signal when a predetermined time-dependent function of the current-dependent digital values corresponding to the current flowing through the wire for any one of said three phases exceeds a predetermined threshold value; and turn-off switch control means responsive to said over-current trip signal for generating turn-off current pulses to actuate the coils of said relays to cause the current switching contacts thereof to open, said turn-off switch control means comprising turn-off pulse generating means for supplying a turn-off current pulse to the coil of each relay, each said current pulse being generated (i) in predetermined time relationship with a zero crossover of the current through the current switching contacts of the corresponding relay when said zero crossover mode signal is present, and (ii) upon occurrence of the overcurrent trip signal when said zero crossover mode signal is absent.

12. The circuit breaker according to claim 11, wherein said current signal processing means converts said AC current signals to current-dependent digital values at a predetermined conversion rate, further comprising means responsive to a zero crossover mode signal for increasing said conversion rate;

13. The circuit breaker according to claim 12, further comprising zero crossover mode determination means for generating a zero crossover mode signal when said current-dependent digital values are above a predefined threshold value, said zero crossover mode signal being coupled to said current signal processing means to increase the conversion rate thereof.

14. The circuit breaker according to claim 11, further comprising phase imbalance detection means coupled to said signal processing means for comparing the current-dependent digital values corresponding to the current flowing through the wire for each of the three phases with the current-dependent digital values corresponding to the currents flowing through the wires for the other phases, and for generating a phase imbalance trip signal when the currents flowing through said wires differ by more than a predetermined threshold amount; said turn-off switch control means generating said turn-off pulses in response to said phase imbalance trip signal.

15. The circuit breaker according to claim 1, wherein each of said turn-off current pulses terminates upon the earlier of (a) expiration of a predetermined time period measured from the beginning of said current pulse and (b) opening of the current switching contacts of the corresponding relay portion.

16. A circuit breaker for controlling the flow of current through a wire from an AC power source to a load, comprising:

a relay having an actuating coil for operating a set of current switching contacts adapted to be connected in series with said wire for interrupting the flow of current from said power source to said load;

current sensing means for providing an AC current signal corresponding to the current flowing through said wire;

current signal processing means for converting said AC current signal to a corresponding current-dependent digital value;

overcurrent condition detection means coupled to said current signal processing means for generating an overcurrent trip signal when a predetermined time-dependent function of the current-dependent digital value corresponding to the current flowing through said wire exceeds a predetermined threshold value; and turn-off switch control means responsive to said over-current trip signal for generating a turn-off current pulse to actuate the coil of said relay to cause the current switching contacts thereof to open, said turn-off switch control means comprising turn-off pulse generating means for supplying a turn-off current pulse to the coil of said relay, each said current pulse being generated (i) in predetermined time relationship with a zero crossover of the current through the current switching contacts of the relay when said zero crossover mode signal is present, and (ii) upon occurrence of the overcurrent trip signal when said zero crossover mode signal is absent.

17. The circuit breaker according to claim 1, 11 or 16, wherein said turn-off switch control means includes means for repetitively generating turn-off pulses so long as said over-current trip signal is present.

18. The circuit breaker according to claim 1, 11 or 16, further comprising means for providing a status signal indicative of the closed or open status of each set of current switching contacts.

* * * * *